United States Patent
MacGougan et al.

(10) Patent No.: US 9,389,316 B2
(45) Date of Patent: Jul. 12, 2016

(54) ELEVATION ASSISTANCE FOR LOCATION DETERMINATION

(71) Applicant: Apple Inc., Cupertino, CA (US)

(72) Inventors: Glenn Donald MacGougan, San Jose, CA (US); Robert Mayor, Half Moon Bay, CA (US)

(73) Assignee: Apple Inc., Cupertino, CA (US)

(*) Notice: Subject to any disclaimer, the term of this patent is extended or adjusted under 35 U.S.C. 154(b) by 583 days.

(21) Appl. No.: 13/794,117

(22) Filed: Mar. 11, 2013

(65) Prior Publication Data
US 2014/0152494 A1    Jun. 5, 2014

Related U.S. Application Data

(60) Provisional application No. 61/657,365, filed on Jun. 8, 2012.

(51) Int. Cl.
| | |
|---|---|
| *G01S 19/01* | (2010.01) |
| *G01S 19/03* | (2010.01) |
| *G01S 19/26* | (2010.01) |

(52) U.S. Cl.
CPC  *G01S 19/03* (2013.01); *G01S 19/26* (2013.01)

(58) Field of Classification Search
CPC ......... G01S 19/01; G01S 19/48; G01S 19/05; G01S 19/25; G01S 19/26
USPC .............. 342/357.31, 357.39, 357.42, 357.64
See application file for complete search history.

(56) References Cited

U.S. PATENT DOCUMENTS

| | | | |
|---|---|---|---|
| 8,160,569 B1* | 4/2012 | VanLaningham et al. . | 455/422.1 |
| 2005/0027450 A1 | 2/2005 | Cox et al. | |
| 2007/0286023 A1 | 12/2007 | Bull et al. | |
| 2009/0066576 A1* | 3/2009 | van Diggelen ........... | 342/357.13 |
| 2009/0210156 A1* | 8/2009 | Riley et al. ................... | 701/300 |
| 2011/0115671 A1* | 5/2011 | Sweet et al. ............. | 342/357.31 |
| 2011/0201357 A1 | 8/2011 | Garrett et al. | |
| 2011/0219009 A1 | 9/2011 | Rosenfeld et al. | |
| 2011/0234455 A1 | 9/2011 | Rosenfeld et al. | |

* cited by examiner

*Primary Examiner* — Harry Liu
(74) *Attorney, Agent, or Firm* — Fish & Richardson P.C.

(57) ABSTRACT

In some implementations, a tightly-coupled elevation-assisted location estimate can be calculated based on digital elevation model (DEM) elevation measurements and global navigation satellite system (GNSS) data. The DEM elevation measurements and GNSS data can be provided as input to an estimator (e.g., a Kalman filter) to calculate an estimated geographic location of a mobile device. In some implementations, DEM elevation data can be filtered before being provided to the Kalman filter for estimating the geographic location of the mobile device. The DEM elevation data can be filtered in response to detecting bridge and/or tunnel events that indicate that the DEM elevation data does not accurately represent the actual elevation of the mobile device.

30 Claims, 10 Drawing Sheets

ELEVATION ASSISTANCE FOR LOCATION DETERMINATION

CROSS REFERENCE TO RELATED APPLICATIONS

This application is a non-provisional of and claims priority to U.S. Provisional Patent Application No. 61/657,365, filed on Jun. 8, 2012, the entire contents of which are hereby incorporated by reference.

TECHNICAL FIELD

The disclosure generally relates to techniques for geographic location determination.

BACKGROUND

Modern mobile devices often include components for determining the current location of the mobile device. The mobile devices can include global navigation satellite system (GNSS) receivers for receiving GNSS signals. The GNSS signals can be used to estimate the current location of the mobile device. Accurate location estimation based on GNSS signals can require signals from four or more satellites. Location estimates can be improved by providing additional non-GNSS location information to the GNSS location estimation process.

SUMMARY

In some implementations, a tightly-coupled elevation-assisted location estimate can be calculated based on digital elevation model (DEM) elevation measurements and global navigation satellite system (GNSS) data. The DEM elevation measurements and GNSS data can be provided as input to an estimator (e.g., Kalman filtering, recursive least-squares estimation, etc) to calculate an estimated geographic location of a mobile device.

In some implementations, DEM elevation data can be filtered or adjusted before being provided to the Kalman filter for estimating the geographic location of the mobile device. The DEM elevation data can be filtered in response to detecting bridge and/or tunnel events that indicate that the DEM elevation data does not accurately represent the actual elevation of the mobile device.

Particular implementations provide at least the following advantages: Location estimates can be improved when fewer and/or low quality GNSS satellite pseudorange measurements are available. DEM elevation data that does not make sense for the context of the mobile device can be filtered to provide a more accurate location estimate.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

System Overview

Figure 1:
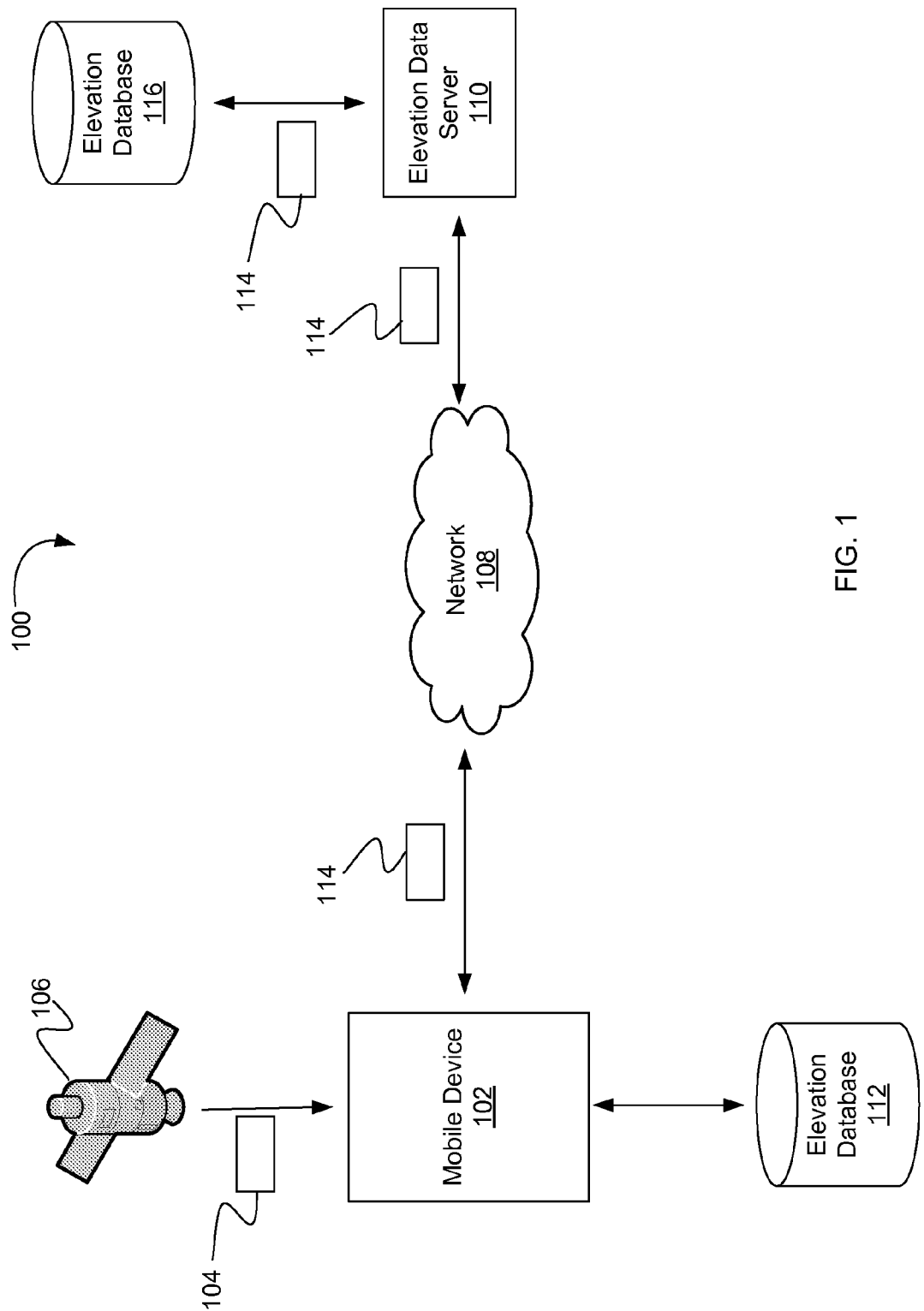
FIG. 1 illustrates an example system for providing elevation assistance for location determination.

FIG. 1 illustrates an example system 100 for providing elevation assistance for location determination. In some implementations, mobile device 102 can be configured to determine a current location of the mobile device based on global navigation satellite system (GNSS) data 104 received from one or more satellites 106. For example, mobile device 102 can use GNSS data 104 to calculate pseudorange data. The pseudorange data can be used to estimate the current location (e.g., latitude, longitude, altitude) and velocity of mobile device 102, according to well-known techniques.

In some implementations, mobile device 102 can use known elevation data to assist the location estimate calculation. For example, by using both pseudorange data and known elevation data to calculate a location estimate, mobile device 102 can more accurately estimate the current location of the mobile device with fewer satellites.

In some implementations, mobile device 102 can include elevation database 112. Elevation database 112 can store elevation data for geographic areas proximate to the current location of mobile device 102. For example, the elevation data can include an elevation model (e.g., a bare earth digital elevation model) of a geographic area (e.g., country, region, continent, planet, etc.). The elevation model can be comprised of elevation model tiles that include elevation data for a smaller geographic region (e.g., one square mile), for example. The smaller elevation model tiles allow for transmission of smaller portions of the elevation model to mobile device 102 when bandwidth and/or storage capacity is constrained.

In some implementations, mobile device 102 can use elevation data stored in elevation database 112 to calculate elevation-assisted location estimates. However, if mobile device 102 determines that elevation database 112 does not have an elevation model tile corresponding to the current location of mobile device 102 stored in elevation database 112, mobile device 102 can request an elevation model tile corresponding to the current location of mobile device 102 from elevation data server 110. For example, mobile device 102 can communicate with elevation data server 110 through network 108 (e.g., the Internet) to obtain an elevation model tile corresponding to the current location of mobile device 102.

In some implementations, mobile device 102 can communicate with elevation data server 110 over a WiFi connection. For example, mobile device 102 can detect when mobile device 102 is associated with a WiFi access point and can request and download elevation model tiles for the current location of the mobile device and all surrounding locations of the mobile device when mobile device 102 has WiFi access. This allows mobile device 102 to take advantage of high bandwidth connections when they are available.

In some implementations, mobile device 102 can communicate with elevation data server 110 over a radio access technology interface (e.g., 3GPP/LTE, CDMA, UMTS, etc.). When mobile device 102 detects that it is connected to network 108 through a radio access technology (e.g., CDMA, GSM, 3GPP/LTE networks), mobile device 102 can conserve bandwidth by requesting and downloading a single elevation model tile for the current location of mobile device 102.

In some implementations, when mobile device 102 requests elevation model tiles from elevation data server 110, mobile device 102 can request tiles corresponding to the current location (and surrounding locations) of mobile device 102. For example, the mobile device can store information that identifies tiles corresponding to the current location of the mobile device and tiles in surrounding locations. Mobile device 102 can transmit information that identifies tiles associated with the current location of the mobile device to elevation data server 110. Elevation data server 110 can use the tile identification information to identify which elevation model tiles stored in elevation database 116 to transmit to mobile device 102 through network 108. For example, elevation database 116 can include an elevation model containing location indexed elevation values for a region, continent, or for the entire planet. The elevation model can be divided into smaller tiles (e.g., one square mile) for distribution to mobile devices. For example, the request from mobile device 102 can include a request for a single tile corresponding to the current location of mobile device 102. The request from mobile device 102 can include a request for the elevation model tile corresponding to the current location of the mobile device 102 and all surrounding elevation model tiles (e.g., the tiles surrounding or adjacent to the elevation model tile corresponding to the current location of the mobile device).

Figure 2:
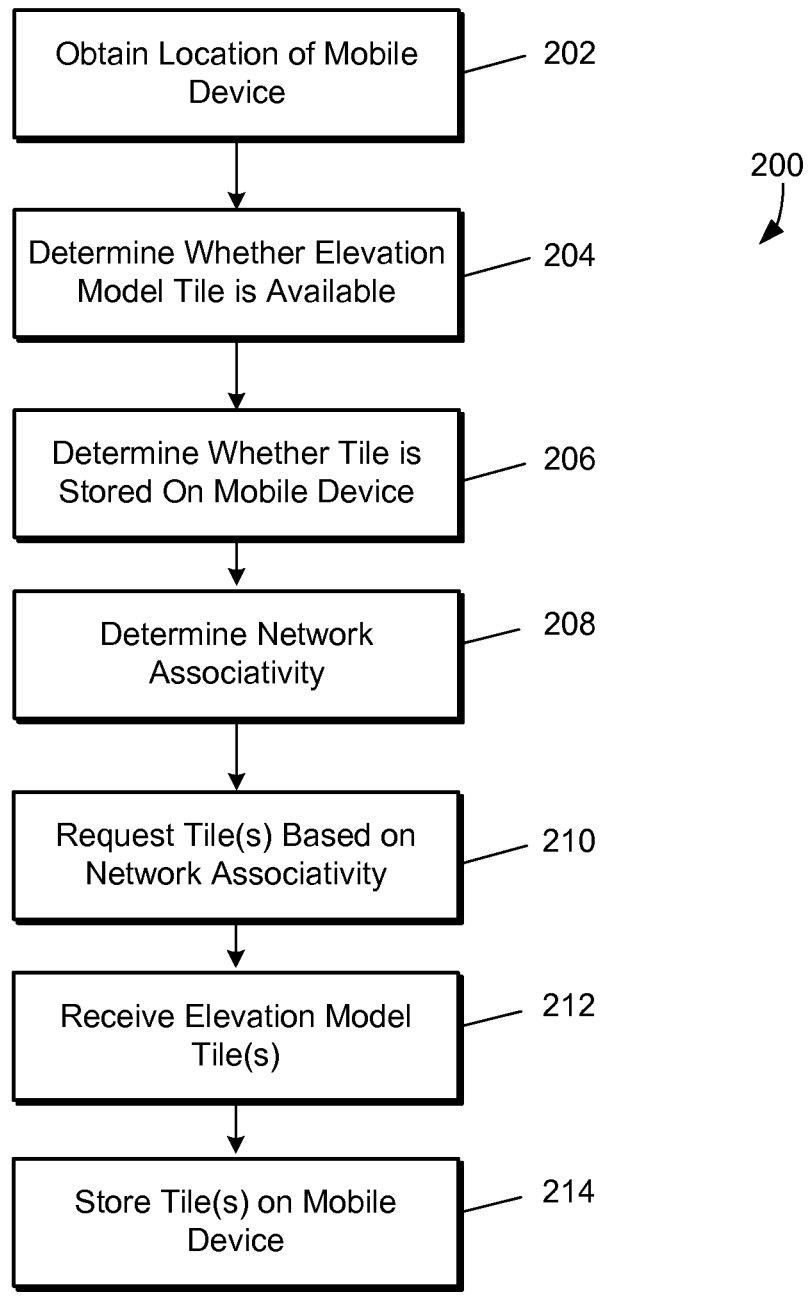
FIG. 2 is flow diagram of an example process for obtaining elevation model data at a mobile device.

FIG. 2 is flow diagram of an example process 200 for obtaining elevation model data at a mobile device. At step 202, the location of the mobile device can be obtained. For example, the mobile device can receive GNSS data from GNSS satellites and determine (e.g., estimate) the current location of the mobile device based on the GNSS data.

At step 204, the mobile device can determine whether an elevation model tile is available for the current location of the mobile device. For example, the mobile device can store a file containing information about elevation model tiles that are available for download. The mobile device can analyze the file to determine whether an elevation model tile exists (e.g., at a network service) for the current location of the mobile device. If an elevation model tile does not exist for the current location of the mobile device, process 200 ends at step 204. If an elevation model tile exists for the current location of the mobile device, process 200 continues to step 206.

At step 206, the mobile device can determine whether the elevation model tile for the current location of the mobile device is currently stored on the mobile device. For example, the mobile device can determine that the elevation model tile exists on an elevation model tile server but is not currently stored on the mobile device. If the elevation tile is currently stored on the mobile device, process 200 ends at step 206. If the elevation tile for the current location of the mobile device is not currently stored on the mobile device, process 200 continues to step 208.

At step 208, the mobile device can determine if the mobile device is associated with a network. For example, the mobile device can determine if the mobile device is currently connected to a WiFi network through wireless LAN access point or other network interface.

At step 210, the mobile device can request elevation model tiles from an elevation data server based on the network associativity determined at step 208. For example, if the mobile device is not connected to a WiFi network (e.g., the mobile device is connected to the Internet through a radio access technology interface), available bandwidth may be low and the mobile device can request a single elevation model tile corresponding to the current location of the mobile device to reduce the bandwidth required to process the request. If the mobile device is connected to a WiFi network, the mobile device can take advantage of the higher bandwidth available through the WiFi network and request not only the elevation model tile for the current location of the mobile device but also request surrounding or adjacent elevation model tiles. The mobile device can determine which tiles are adjacent to the elevation model tile for the current location of the mobile device by referencing the elevation model availability file described above.

At step 212, the mobile device can receive the requested elevation model tiles from the elevation data server. At step 214, the mobile device can store the requested elevation model tiles on the mobile device.

In some implementations, downloading elevation model tiles to the mobile device can be restricted based on movement of the mobile device. For example, if the mobile device is moving faster than a threshold speed (e.g., 20 m/s), then the mobile device will not request elevation model tiles from the elevation data server. The speed restriction will prevent the mobile device from attempting to download multiple elevation model tiles on long drives at freeway speeds where the elevation model tiles may not be used or where the mobile device would have to download many tiles to keep up with the quickly changing location of the mobile device.

In some implementations, downloading elevation model tiles to the mobile device can be restricted when the mobile device already has a good location estimate. For example, when the GNSS processor has a good location estimate for the mobile device, the GNSS processor can be placed in low-power mode. The mobile device can abstain from downloading elevation model tiles when the GNSS processor is in a low-power mode when the elevation model tiles are not needed.

In some implementations, elevation model tiles can be deleted from the mobile device to free up storage space on the mobile device. For example, if an elevation tile is not used for a specified or predetermined number of days (e.g., seven days), the mobile device can delete the elevation tile from the mobile device.

Figure 3:
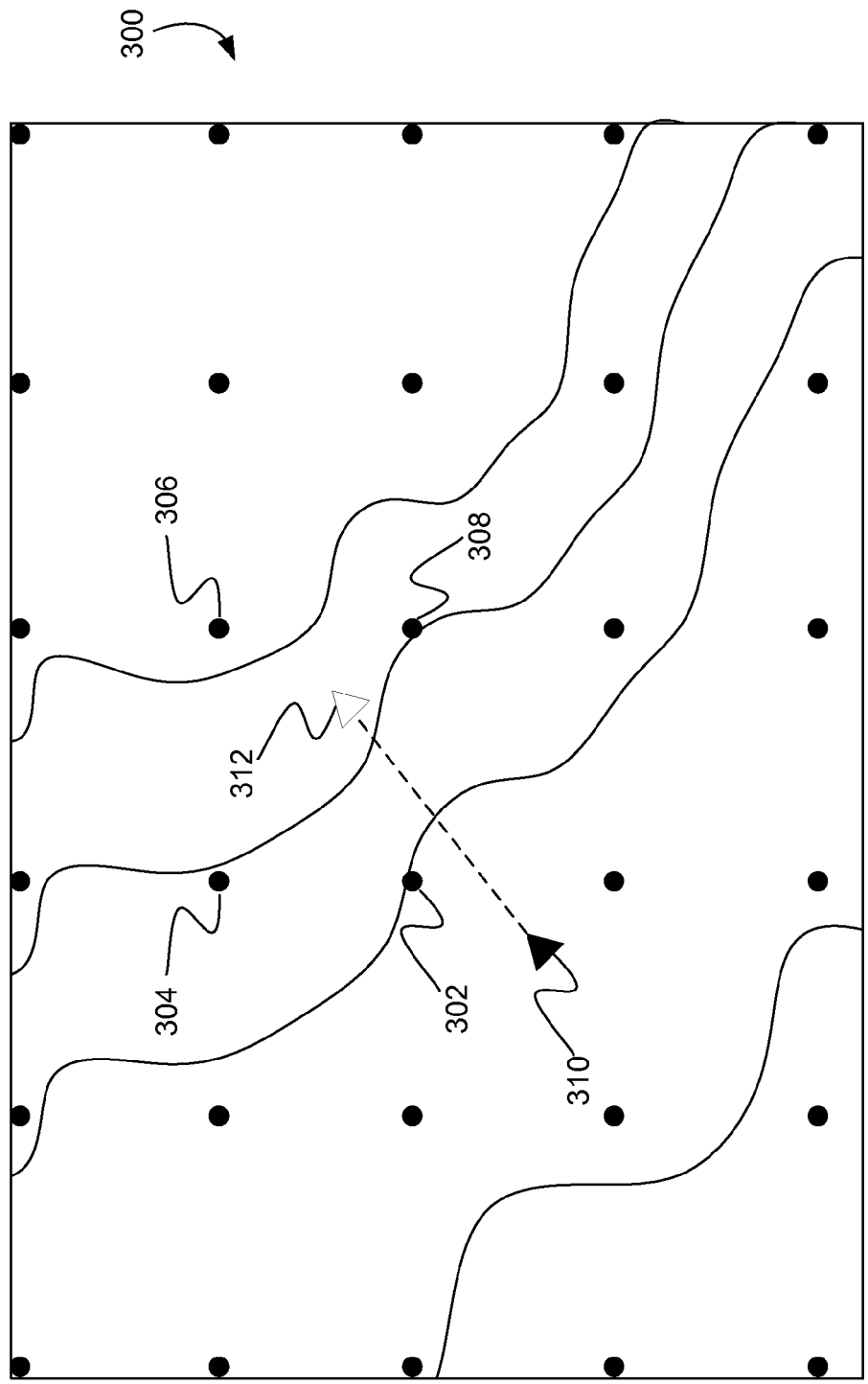
FIG. 3 is an example illustration of an elevation model for a geographic area.

FIG. 3 is an example illustration 300 of an elevation model for a geographic area. For example, the elevation data model can be an elevation model tile corresponding to a location of mobile device 102. Each dot (e.g., location) in illustration 300 corresponds to a location-indexed elevation. For example, locations 302, 304, 306 and 308 each have respective latitude and longitude coordinates. Locations 302, 304, 306 and 308 each have respective elevation values. The elevation values can correspond to known bare earth measurements for the locations represented by dots 302, 304, 306 and 308.

In some implementations, the elevation data model can be used to estimate a location of mobile device 102 by first determining the current location 310 and velocity of mobile device 102 using GNSS data, as described above. Once the current GNSS location 310 and velocity of the mobile device is determined, the current location 310 can be propagated forward (e.g., one second) based on the position, velocity and time values generated from the GNSS data. The propagated location 312 (e.g., longitude and latitude) can then be used to lookup an elevation measurement in the elevation data model.

In some implementations, the propagated location can fall between elevation locations represented in the elevation model. For example, propagated location 312 falls between locations 302, 304, 306 and 308 representing elevation measurement locations in the elevation data model. The elevation for location 312 between locations 302, 304, 306 and 308 can be interpolated (e.g., estimated) using bilinear interpolation or cubic convolution techniques, for example.

In some implementations, the elevation for the propagated location of the mobile device can be adjusted to account for the elevation of a user of the mobile device. For example, a 1.3 meter height bias can be added to the elevation to account for the height at which the mobile device is being held by a user.

Tightly-Coupled Elevation Assistance

In some implementations, the elevation data determined for the propagated location (above) can be used to perform tightly-coupled elevation-assisted location estimation. For example, provided mobile device 102 is at ground level, the elevation obtained from the elevation model (e.g., elevation model tile) of known ground elevations can be used in the GNSS estimation process to improve position solution accuracy. Elevation accuracy can be improved and, in many cases with poor solution geometry (e.g., usually due to a low number of GNSS satellites in solution), the horizontal positioning accuracy can also be improved.

In some implementations, the ability to detect GNSS pseudorange measurement faults (e.g. a large multipath delay) is also improved in cases with a low number of GNSS satellites in solution. This is because the elevation observation increases the solution redundancy (e.g., the number of measurements used to estimate location) by one. For example, if only four satellite observations are available to estimate the four typical GNSS unknowns (e.g. latitude, longitude, altitude and clock bias), it is not possible to detect a problem with the solution. With the addition of the ground elevation observation for the location of the mobile device there are five observations and four unknowns and it becomes possible to test for a problem with the solution.

In some implementations, GNSS-based estimates can also be used to test the elevation observation. For example, if the device is not at ground level, and there is sufficient GNSS satellite observation redundancy, a statistical test of the elevation observation can identify that the elevation look-up is not usable and the GNSS-only elevation estimate should be used. This synergy between the elevation look-up data and GNSS ensures that the best altitude value is provided to the user (e.g., either the tightly-coupled altitude estimate or the GNSS-only altitude estimate). Additionally, GNSS location estimation can be improved by increasing the degrees of freedom in the estimation process. This improves accuracy directly and strengthens the statistical tests used to identify GNSS measurement faults.

In some implementations, tightly-coupled elevation assistance for GNSS location estimates can be can be performed using a sequential discrete-time extended Kalman filter. The implementations of the discrete-time extended Kalman filter can be made more computationally efficient by adding statistically independent measurements (e.g., GNSS pseudorange data and elevation model data) sequentially (e.g., updating the filter one measurement at a time). The sequential update strategy can also improve the ability to detect measurement faults provided the measurements are added with increasing likelihood of a measurement fault (e.g., the most reliable measurements are provided to the Kalman filter first).

Summary of Kalman Filter Equations

Kalman filters are well known and have many applications. The following Kalman filter equations provide a summary of the sequential discrete-time extended Kalman filter equations used in various implementations described herein.

In the case of the DEM elevation filter, the functional model is linear (e.g., $h_i=1$) and only one measurement is available each epoch. The filter is manipulated by deweighting the DEM elevation observations based on detected rise, fall, bridge and tunnel events.

The linearized form of the functional model is:

$$z_i = h_i \hat{\delta}_x \quad (1)$$

where $\hat{\delta}_x$ is the error state vector and $h_i$ is the $i^{th}$ design vector. The measurement model is:

$$v_i = z_i + \epsilon_i = l_i - \hat{l}_i \quad (2)$$

where $v_i$ is the $i^{th}$ measurement innovation; $l_i - \hat{l}_i$ is the measured value minus the estimated value; and $\epsilon_i$ is the measurement noise. The dynamics model from epoch k−1 to k is:

$$\hat{x}_k = \Phi_{k-1,k} \hat{x}_{k-1} + w_{k-1} \quad (3)$$

where $\hat{x}_k$ is the vector of unknown parameters (e.g., Equation (10), below); $\Phi_{k-1,k}$ is the state transition matrix; and $w_{k-1}$ is the white noise sequence. The stochastic model of normally distributed independent measurements not correlated in time and driven by white noise not correlated in time is:

$$\epsilon_i \sim (0, \sigma_i^2)$$

$$E[\epsilon_i \epsilon_j] = 0$$

$$E[\epsilon_k \epsilon_{k-1}] = 0$$

$$w_k \sim N(0, Q_k)$$

$$E[w_k w_{k-1}^T] = 0$$

$$E[w_k \epsilon_i] = 0 \, \forall k,i \quad (4)$$

where $Q_k$ is the process noise matrix. The initial conditions of the Kalman filter are:

$$E[x_0] = \hat{x}_0$$

$$E[x_0 \hat{x}_0^T] = P_0 \quad (5)$$

The equation for covariance prediction is:

$$P_k^- = \Phi_{k-1} P_{k-1}^+ \Phi_{k-1}^T + Q_{k-1} \quad (6)$$

where superscript minus (−) means pre-update and superscript plus (+) means post-update. The Kalman filter update equations are:

$$\hat{\delta}_{x_{k_i}}^- = 0 \quad (7)$$

$$\hat{\delta}_{x_{k_i}}^+ = k_i v_i$$

$$\hat{x}_{k_i}^+ = \hat{x}_{k_i}^- + \hat{\delta}_{x_{k_i}}^+$$

where $k_i$ is the Kalman gain filter. The Kalman gain equations are:

$$k_i = P_{k_i}^- h_i^T (1/\sigma_{v_i}^2)$$

$$\sigma_{v_i}^2 = h_i P_k^- h_i^T + \sigma_i^2 \quad (8)$$

where $\sigma_{v_i}^2$ is the scalar inversion variance of the innovation. The covariance update is:

$$P_{k_i}^+ = [I - k_i h_i] P_{k_i}^- \quad (9)$$

where the covariance update is performed sequentially.

In the equations above, bold lowercase indicates a vector, bold uppercase indicates a matrix, otherwise scalar values are used. The term 'i' indicates the $i^{th}$ measurement for a given epoch 'k'.

Tightly-Coupled Elevation-Assisted Estimation

In some implementations, the GNSS position estimation process can be parameterized using GNSS clock bias (dT), in meters and earth centered earth fixed (ECEF) coordinates (x, y and z) in meters. The vector of unknown parameters is:

$$\hat{x} = \begin{bmatrix} x \\ y \\ z \\ dT \end{bmatrix} \quad (10)$$

The non-linear GNSS pseudorange functional model is:

$$P = p + c(dT); \quad (11)$$

$$p = \sqrt{(x_s + x)^2 + (y_s + y)^2 + (z_s + z)^2} \quad (12)$$

where P is a pseudorange measurement, p is the geometric range from the phase center of the GNSS antenna of the satellite, c is the speed of light, dT is the unknown receiver clock offset, $x_s$, $y_s$ and $z_s$ are the ECEF coordinates of the satellite, and x, y, and z are the unknown ECEF coordinates of the GNSS antenna of the mobile device.

Using Taylor's series expansion, the corresponding linearized functional model is:

$$P = \hat{P} + \frac{\partial P}{\partial x}(x - \hat{x}) + \frac{\partial P}{\partial y}(y - \hat{y}) + \frac{\partial P}{\partial z}(z - \hat{z}) + \frac{\partial P}{\partial cdT}(cdT - \widehat{cdT}) \quad (13)$$

$$h_P = \begin{bmatrix} \frac{\partial P}{\partial x} & \frac{\partial P}{\partial y} & \frac{\partial P}{\partial z} & \frac{\partial P}{\partial cdT} \end{bmatrix} = \quad (14)$$

$$\begin{bmatrix} \frac{-(x_s - \hat{x})}{\hat{p}} & \frac{-(y_s - \hat{y})}{\hat{p}} & \frac{-(z_s - \hat{z})}{\hat{p}} & 1 \end{bmatrix}$$

$$\hat{\delta}_{x_P} = \begin{bmatrix} x - \hat{x} \\ y - \hat{y} \\ z - \hat{z} \\ cdT - \widehat{cdT} \end{bmatrix} = \begin{bmatrix} \hat{\delta}_x \\ \hat{\delta}_y \\ \hat{\delta}_z \\ \widehat{c\delta T} \end{bmatrix} \quad (15)$$

$$\hat{v} = P - \hat{P} = h_P \hat{\delta}_{x_P} \quad (16)$$

where $\hat{P}$, $\hat{p}$, $\hat{x}$, $\hat{y}$ and $\hat{z}$ are the estimated values at the point of expansion, $\hat{v}$ is a pseudorange measurement innovation, $h_P$ is the pseudorange design vector, and $\hat{\delta}_{x_P}$ is the vector of estimated error states for the pseudorange measurement.

The altitude functional model is:

$$a_{dem} = a \quad (17)$$

where a is the geodetic altitude measurement (e.g. altitude with respect to the WGS84 reference ellipsoid). The altitude innovation can be defined as:

$$\hat{v}_{dem} = a - \hat{h} \quad (18)$$

where $\hat{h}$ is the filtered estimate of geodetic elevation. With respect to a geodetic latitude ($\phi$), geodetic longitude ($\lambda$), geodetic height (h), and clock bias (dT) solution parameterization, this is already a linear function model with the following design vector:

$$h_{lg} = [0\ 0\ 1\ 0] \quad (19)$$

This design vector needs to be rotated from the local geodetic frame to the ECEF frame. This is accomplished by the following:

$$h_{dem}^T = R \cdot h_{lg}^T \quad (20)$$

$$R = \begin{bmatrix} -\sin\phi\cos\lambda & -\sin\lambda & \cos\phi\sin\lambda & 0 \\ -\sin\phi\sin\lambda & \cos\lambda & \cos\phi\sin\lambda & 0 \\ \cos\phi & 0 & \sin\phi & 0 \\ 0 & 0 & 0 & 0 \end{bmatrix} \quad (21)$$

$$h_{dem} = [\sin\phi\cos\lambda\ \cos\phi\sin\lambda\ \sin\phi\ 0] \quad (22)$$

where $\phi$ is the approximate solution geodetic latitude, and $\lambda$ is the approximate solution geodetic longitude.

The tightly-coupled estimation proceeds with standard sequential updates of the Kalman filter using the pseudorange design vectors and pseudorange innovations and the altitude design vector and altitude innovation using an appropriate update order.

Tightly-Coupled Elevation-Assisted Estimation Process

Figure 4:
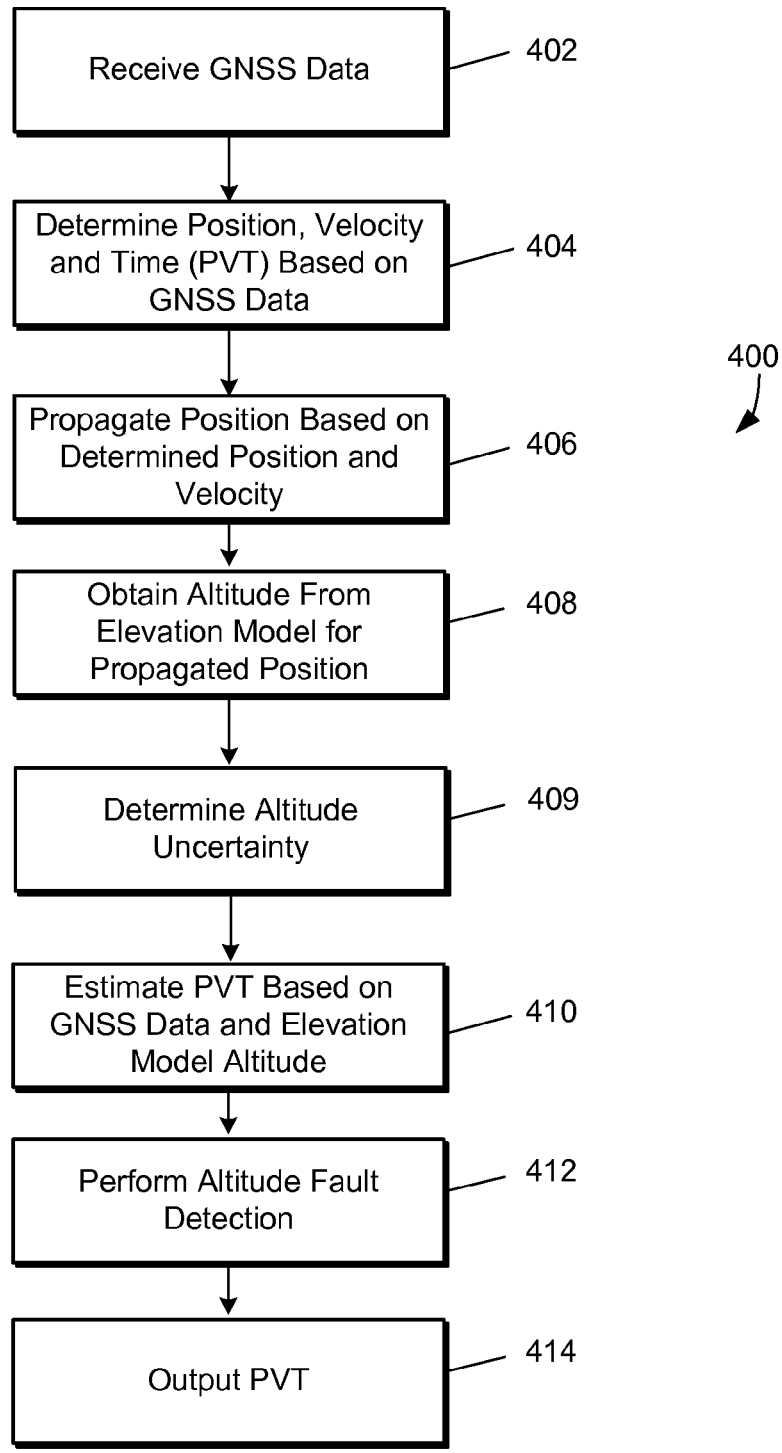
FIG. 4 is flow diagram of an example tightly-coupled elevation-assisted estimation process.

FIG. 4 is flow diagram of an example tightly-coupled elevation-assisted estimation process 400. At step 402, GNSS data is received. For example, GNSS data can be received from one or more satellites that broadcast signals used for geographic location estimation. The satellites can be associated with GPS, GLONASS, Galileo and/or Beidou systems constellations, for example.

At step 404, position, velocity and time (PVT) estimates can be determined based on the GNSS data. For example, GNSS location estimations can be performed according to well-known algorithms to obtain latitude, longitude, altitude, and velocity estimates for the mobile device.

At step 406, the position of the mobile device can be propagated based on the position and velocity estimates determined at step 404. For example, the PVT estimates calculated at step 404 can be used to propagate the position of the mobile device forward by one second.

At step 408, the propagated position can be used to obtain an elevation value for the propagated location from an elevation model. For example, the elevation value can be obtained from a digital elevation model (DEM) lookup table (e.g., elevation model tile) stored on the mobile device. In some implementations, the DEM can include orthometric elevation values and a conversion may be performed to convert the orthometric elevation values to a geodetic elevation using a geoidal undulation lookup table. Alternatively, the DEM can be pre-converted to use geodetic elevation so that an orthometric to geodetic conversion will not be necessary at the mobile device. The mobile device can obtain the DEM lookup table according to process 200 of FIG. 2, for example.

At step 409, an elevation uncertainty can be determined for the elevation value. For example, an elevation uncertainty value associated with the elevation value obtained at step 408 can be determined. In some implementations, the elevation uncertainty value can be the minimum of a predefined minimum uncertainty value (unc_min) compared to the range of DEM elevation values (elev_range) within a distance (d_range) of the propagated location divided by two (e.g., minimum of unc_min and [elev_range/2]). The distance (d_range) can be the maximum of a predefined minimum distance value (d_min) or the distance can be derived from GNSS position uncertainty data. For example, the distance can correspond to the horizontal position uncertainty distance (d_hpu) of the GNSS fix for the mobile device. In other words, the GNSS position fix can have an associated probability region (e.g., 67% probability region) where there is a 67% probability that the best estimate of the position of the mobile device is within the probability region. The probability region can correspond approximately to a region within a radial distance of the position fix of the mobile device. This radial distance is the approximate horizontal position uncertainty. In some implementations, the distance (d_range) used for determining the range of DEM elevation values can be the maximum of d_min and d_hpu. The range of DEM elevation values (elev_range) is computed by calculating the difference of the minimum (min_elev) and maximum elevation (max_elev) values (e.g., max_elev−min_elev) within the determined distance (d_range) of the propagated position fix.

At step 410, a PVT estimate can be calculated based on the GNSS data, the elevation value from the elevation model and the determined elevation uncertainty value. For example, the elevation value can be a geodetic elevation value obtained from the DEM at step 408. The elevation value and elevation uncertainty value can be provided to the Kalman filter and a location estimate (PVT) can be generated based on the elevation value and elevation uncertainty value (e.g., measurement variance).

In some implementations, the pseudorange measurements and elevation values can be sorted so that measurements that are the most likely to be unbiased are used to update the Kalman filter first. In some implementations, the elevation measurement update will not be performed first (e.g., before pseudorange updates) if there is sufficient satellite redundancy (e.g., four or more satellites). This is because the clock bias term, a nuisance term, often absorbs common mode delay error (e.g., time-correlated multipath error). The GNSS estimate (PVT) can be calculated by performing sequential Kalman filter measurement updates using the pseudorange measurements and DEM elevation values. The discrete-time sequential Kalman filter equations used for location estimation are described below.

At step 412, fault detection can be performed. For example, a statistical test of the innovation can be performed to identify and remove potential measurement faults (e.g., pseudorange and/or DEM elevation measurement faults). For example, a measurement fault can correspond to a pseudorange biased by multipath or a ground elevation observation (DEM value) that occurs when the mobile device is elevated (e.g., on top of a building).

At step 414, the resulting estimated PVT can be output from the tightly-coupled elevation-assisted location estimation process. For example, the estimated PVT (e.g., location, velocity, etc.) can be provided to applications running on the mobile device and used to provide various location based services. For example, a mapping application can display the location, use the location to track the movement of the mobile device, and/or provide directions from the current estimated location to another location. A search application can use the estimated location to determine search results proximate to the estimated location, for example.

Elevation Filter Overview

In some implementations, DEM elevation values can be filtered based on detection of an elevation measurement error event. For example, an elevation measurement error event can be detected when the DEM elevation value obtained from the elevation model does not make sense for the activity context of the mobile device. Thus, an activity context of the mobile device can be used to detect elevation measurement error events. For example, if the activity context of the mobile device is flying (e.g., the mobile device is in a flying aircraft), then DEM elevation values will not be used in the location estimation process described above because earth elevation values do not apply to the location of the mobile device when it is in the air. If the activity context of the mobile device is driving (e.g., the mobile device is in a moving grounded automobile), then DEM elevation values can be filtered based on the amount of change in elevation that is observed. For example, vehicular road grades (e.g., slope) do not exceed certain values. When DEM elevation values indicate that the slope (e.g., DEM elevation over distance) of the ground has exceeded a maximum (or minimum) road grade, the mobile device can determine that the moving vehicle has entered a tunnel or is traversing a bridge. Based on this determination, the mobile device can filter the DEM elevation values prior to providing the DEM elevation values to the location estimation process described above. For example, it would not make sense that the mobile device would change elevation so quickly (e.g., high slope value) in a driving context because a vehicle would, generally, not drive on roads that exceed the maximum road grade. In some implementations, DEM elevation values can be filtered when the activity context of the mobile device is associated with a user walking or running (e.g., the mobile device is moving at a speed corresponding to a user walking or running)

Figure 5:
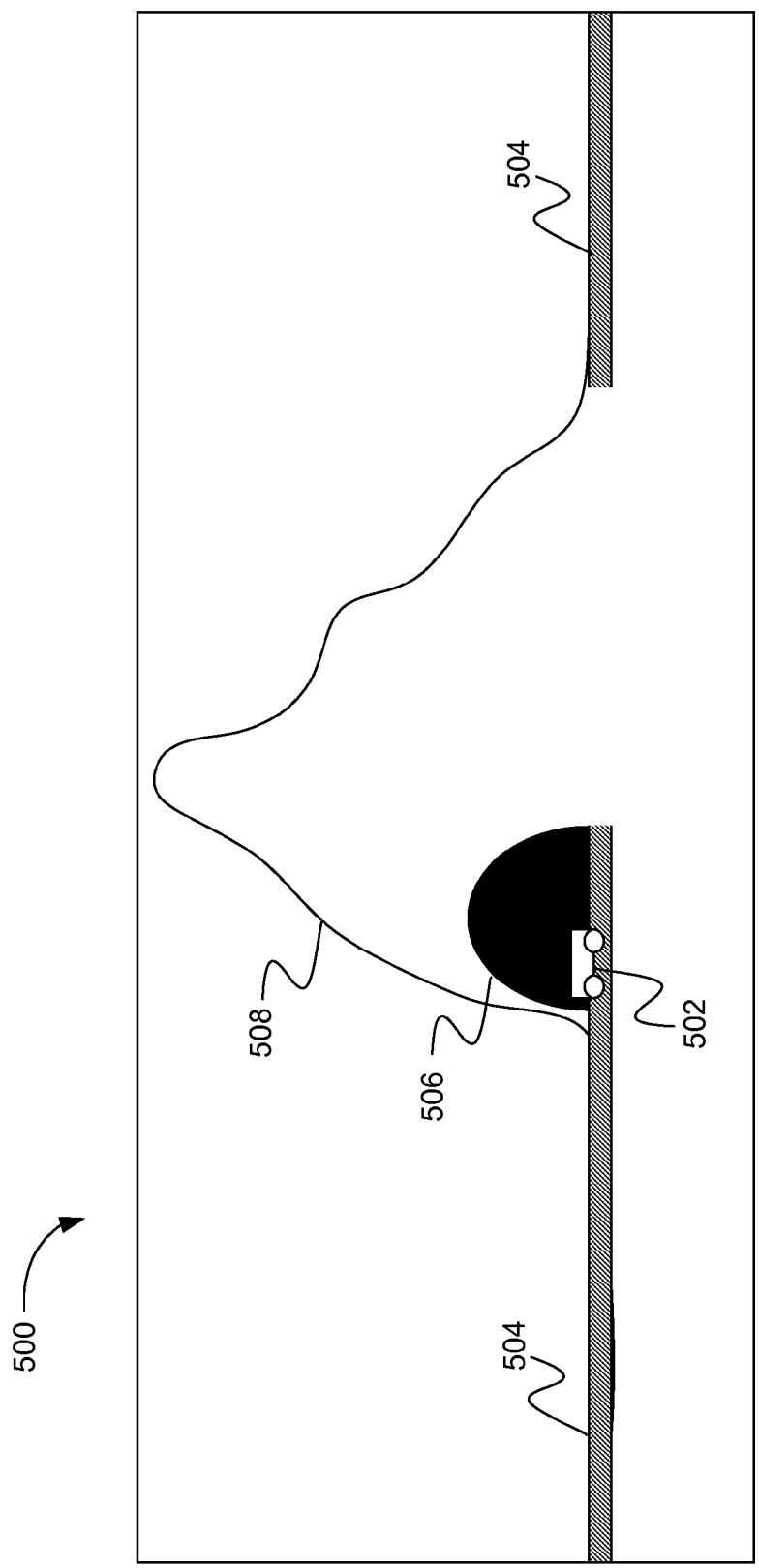
FIGS. 5 and 6 illustrate an example of filtering DEM elevation data based on a detected tunnel event in a driving context.
Figure 6:
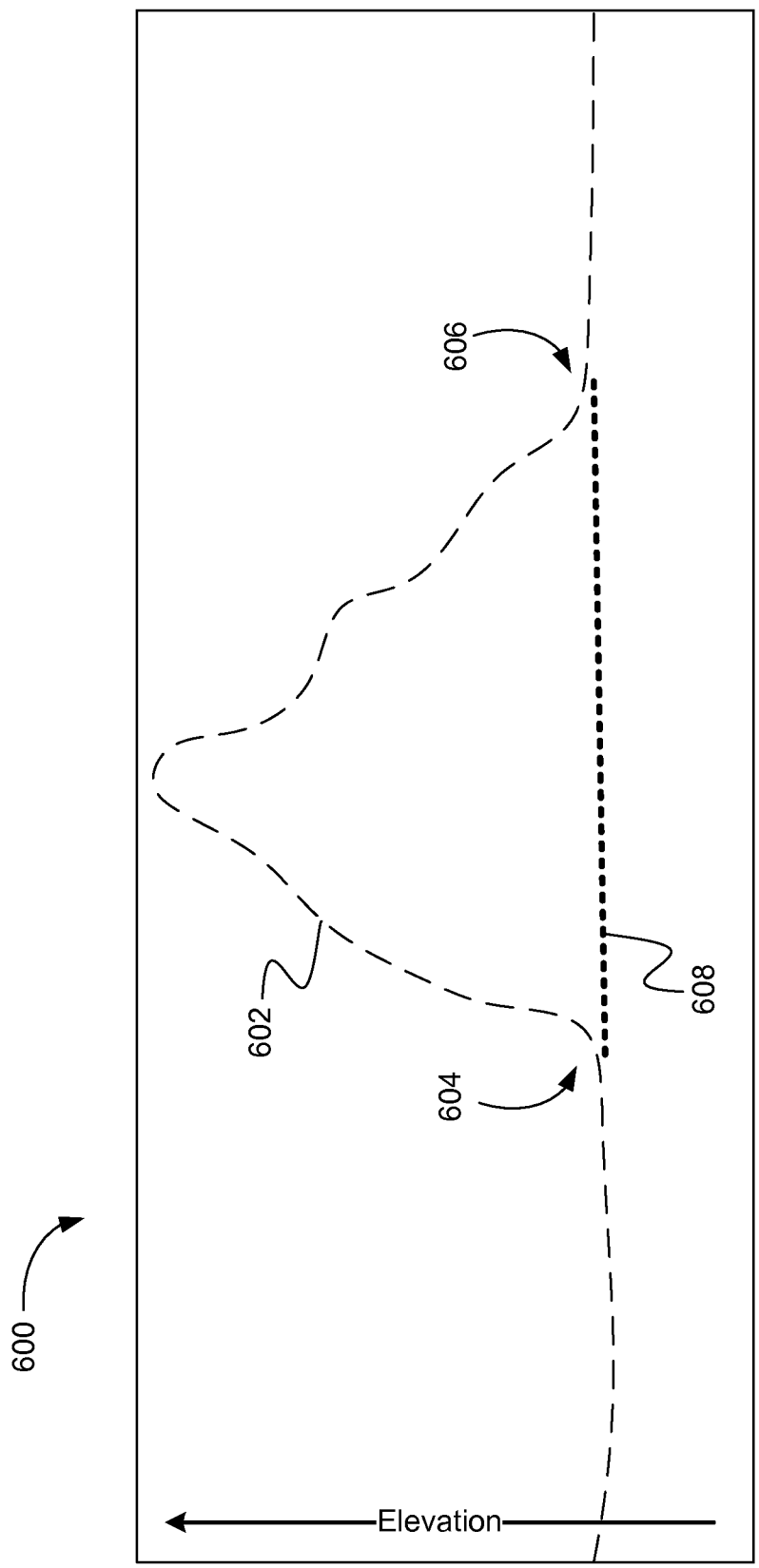

FIGS. 5 and 6 illustrate and example of filtering DEM elevation data based on a detected tunnel event in a driving context. Illustration 500 of FIG. 5 shows a vehicle 502 travelling along a road 504 and entering a tunnel 506 in mountain 508. A mobile device on board vehicle 502 can use DEM elevation data to assist in determining the location of the mobile device as vehicle 502 is moving. However, when vehicle 502 enters tunnel 506, the actual elevation of vehicle 502 and the elevation obtained from the DEM will diverge. The DEM data will reflect the elevations of the mountain and not the elevation of the vehicle. Thus, the DEM elevation data will be inaccurate (e.g., the mobile device may be subject to an elevation measurement error) while the vehicle is within the tunnel. For example, the DEM elevation data will indicate a dramatic increase in elevation corresponding to the elevation of mountain 508 while the vehicle continues along at a relatively constant elevation while traveling through tunnel 506. Thus, the DEM elevation data will not reflect an accurate elevation data for the location of vehicle 502 until vehicle 502 exits tunnel 506.

FIG. 6 illustrates a graph 600 of filtered and unfiltered elevation data. For example, dashed line 602 corresponds to unfiltered DEM elevation data for the driving context of FIG. 5. Initially (at the left), line 602 has almost zero slope (e.g., 0% grade). However, when line 602 reaches location 604, the slope of line 602 dramatically increases. When the mobile device determines that the slope of line 602 exceeds a threshold slope value (e.g., a maximum road grade), a tunnel event (e.g., an elevation measurement error event) can be detected and the DEM elevation data can be filtered. For example, once the threshold slope value is exceeded, the location estimation process will deweight the DEM elevation value updates until the vehicle exits the tunnel. Dashed line 608 represents the estimated elevation value while the vehicle is within the tunnel. For example, the estimated elevation value can be a previous DEM elevation value that was observed before the slope of line 602 exceeded the threshold slope value (e.g., since new DEM elevation values are deweighted, no change in elevation will be observed while the vehicle is in the tunnel).

Once vehicle 506 exits the tunnel, the mobile device can resume using DEM elevation data corresponding to the vehicle's location to update the current location estimation. In some implementations, the mobile device can determine that vehicle 506 has exited the tunnel when the DEM elevation data matches or approximates a predetermined elevation value. For example, the predetermined elevation value can correspond to the DEM elevation value observed immediately before the tunnel event was detected. Location 606 illustrates the convergence of DEM elevation data (line 602) and the elevation value (line 608) used by the mobile device while the mobile device was in the tunnel. For example, once line 602 and line 608 converge, the mobile device can resume using DEM elevation to assist in location estimation.

Figure 7:
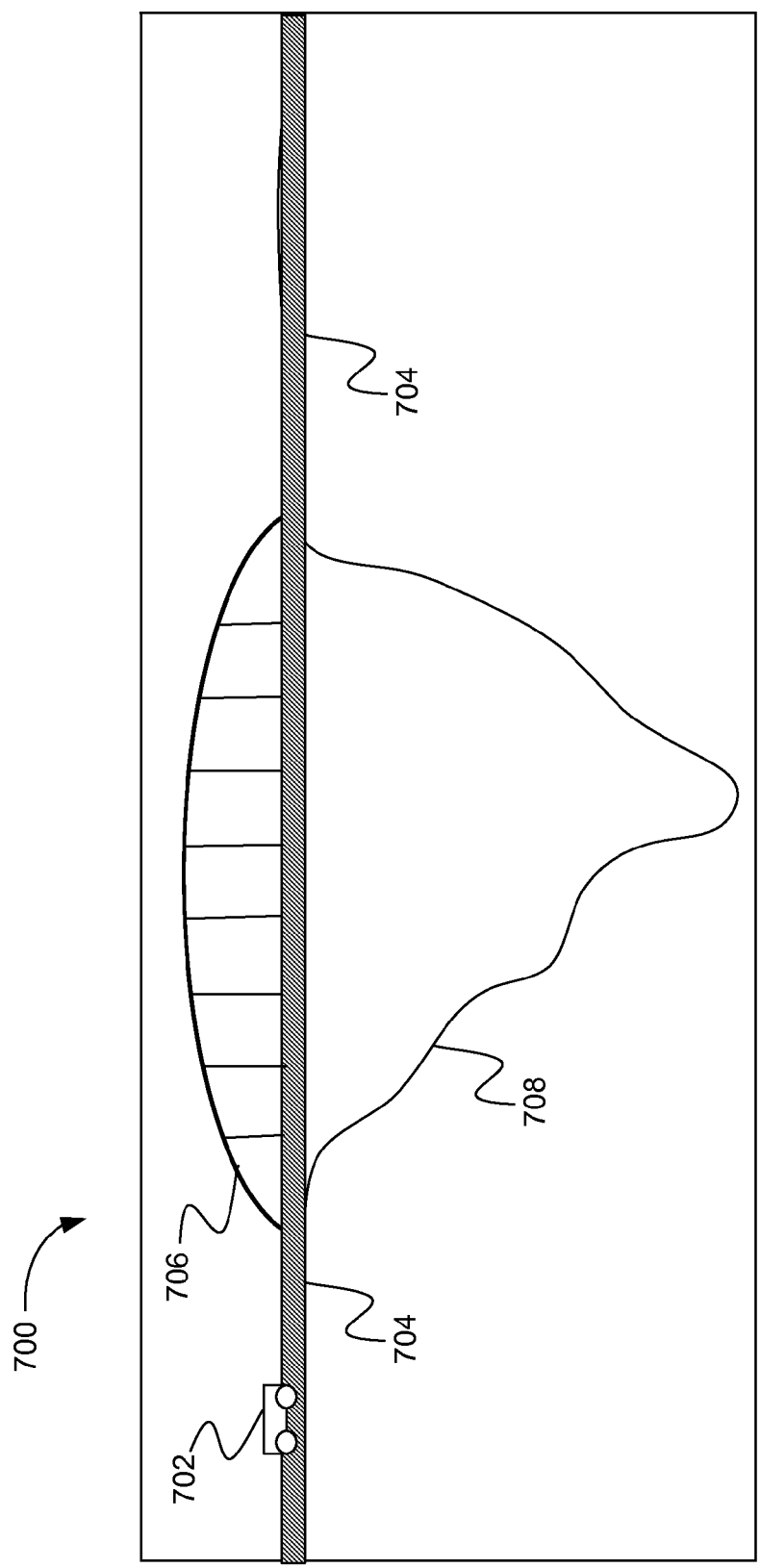
FIGS. 7 and 8 illustrate an example of filtering DEM elevation data based on a detected bridge event in a driving context.
Figure 8:
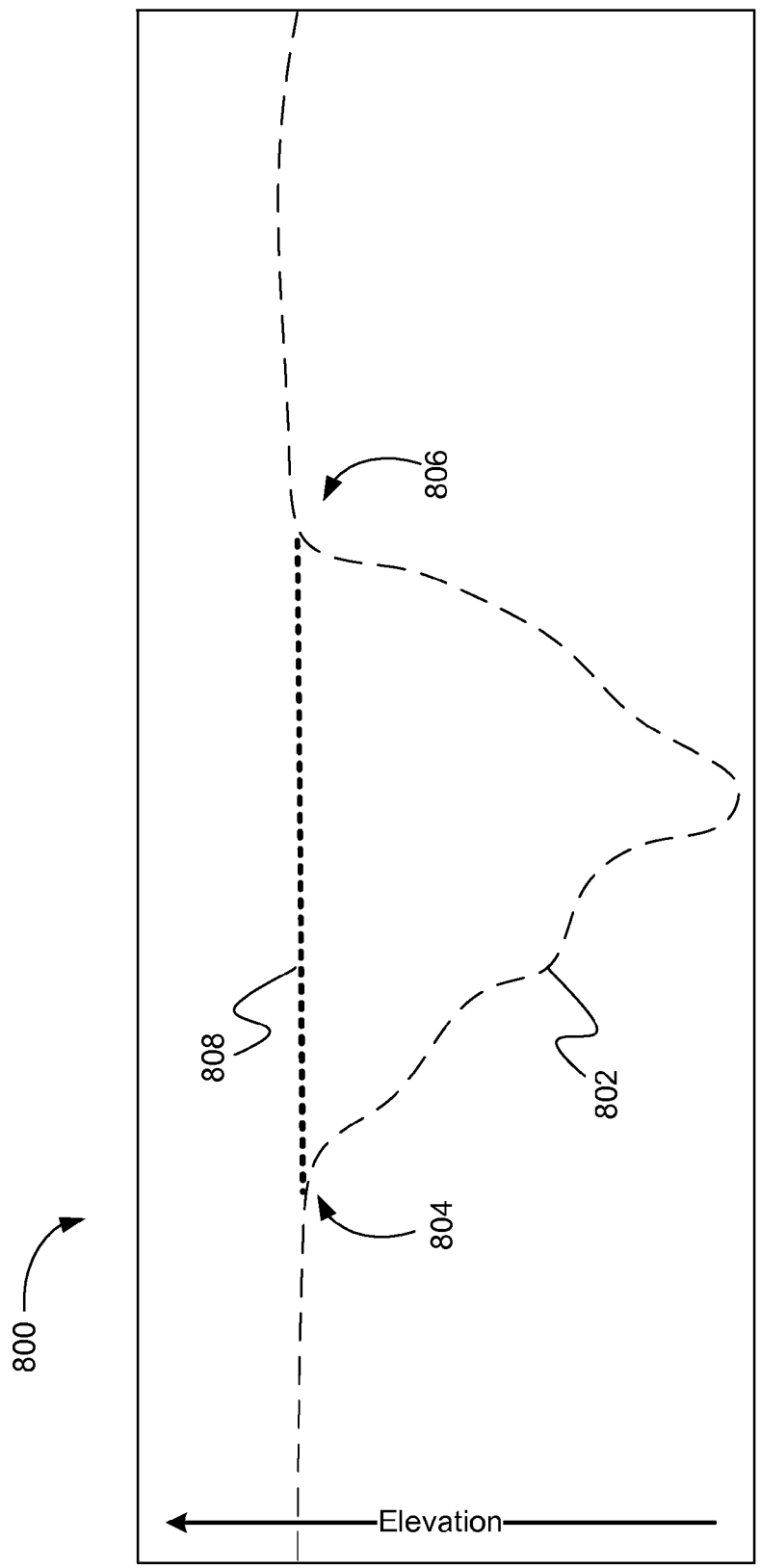

FIGS. 7 and 8 illustrate and example of filtering DEM elevation data based on a detected bridge event in a driving context. Illustration 700 of FIG. 7 shows a vehicle 702 travelling along a road 704 and crossing a bridge 706 over ravine 708. A mobile device on board vehicle 702 can use DEM elevation data to assist in determining the location of the mobile device as vehicle 702 is moving. However, when vehicle 702 moves onto bridge 706, the actual elevation of vehicle 702 and the elevation obtained from the DEM will diverge. The DEM data will reflect the elevations of ravine 708 and not the elevation of vehicle 702. Thus, the DEM elevation data will be inaccurate (e.g., the mobile device may be subject to an elevation measurement error) while vehicle 702 is on bridge 706. For example, the DEM elevation data will indicate a dramatic decrease in elevation corresponding to the elevation of ravine 508 while the vehicle continues along at a relatively constant elevation while traveling over bridge 706. Thus, the DEM elevation data will not reflect an accurate elevation data until vehicle 702 moves off of bridge tunnel 706 on the other side of ravine 708.

FIG. 8 illustrates a graph 800 of filtered and unfiltered elevation data. For example, dashed line 802 corresponds to unfiltered DEM elevation data for the driving context of FIG. 7. Initially (at the left), line 802 has almost zero slope (e.g., 0% grade). However, when line 802 reaches location 804, the slope of the line dramatically increases. When the mobile device determines that the slope (e.g., absolute value of the slope) of line 802 exceeds a threshold slope value (e.g., a maximum road grade), a bridge event (e.g., an elevation measurement error event) can be detected and the DEM elevation data can be filtered. For example, once the threshold slope value is exceeded, DEM elevation data updates can be deweighted so that the estimated elevation of the vehicle is not influenced by the DEM elevation data. Dashed line 808 represents the estimated elevation while the vehicle on the bridge. For example, the estimated elevation value can correspond to previous DEM elevation values that were observed before the slope of line 802 exceeded the threshold slope value.

Once vehicle 702 exits the bridge, the mobile device can resume using DEM elevation data corresponding to the vehicle's location to update the current location estimation. In some implementations, the mobile device can determine that vehicle 506 has exited the bridge when the DEM elevation data matches or approximates a predetermined elevation value. For example, the predetermined elevation value can correspond to the DEM elevation value observed before the bridge event was detected. Location 806 illustrates the convergence of DEM elevation data (line 802) and the elevation value (line 808) used by the mobile device while the mobile device was in the bridge. For example, once line 802 and line 808 converge, the mobile device can resume using DEM elevation to assist in location estimation.

Elevation Filter Calculations

In some implementations, DEM elevation (e.g., height) observations are provided to an estimator (e.g., Kalman filter) with an associated measurement variance. The Kalman filter is updated with these observations and with the provided measurement variance unless the slope of the current update exceeds a threshold slope value. If the slope of the current DEM elevation update exceeds a threshold slope value, an elevation measurement error event can be detected and the DEM elevation observations can be deweighted (e.g., filtered, adjusted) when the Kalman filter is updated. Slope (s) can be calculated by Equation 23 (below), unless the distance traveled between updates is less than five meters (5 m). If the distance traveled is less than five meters, the slope is set to zero for the purpose of DEM elevation filtering.

$$s = \frac{h_k - h_{k-1}}{d_{k-1,k}} \quad (23)$$

where s is the calculated slope, $h_k$ is the DEM elevation observation for the current update, $h_{k-1}$ is the DEM elevation observation from the previous update, and $d_{k-1,k}$ is the distance between the current update and the previous update. This distance ($d_{k-1,k}$) is defined by Equation 24, below.

$$a = 6378137.0$$

$$e^2 = 0.00669437999014132$$

$$W = \sqrt{1.0 - e^2 \sin(\phi_k)\sin(\phi_k)}$$

$$M = a(1.0 - e^2)/W^3 \quad (24)$$

$$N = a/W$$

$$d_N = (\phi_k - \phi_{k-1})/(M + h_k)$$

$$d_E = (\lambda_k - \lambda_{k-1})/((N + h_k)\cos\phi_k)$$

$$d_{k-1,k} = \sqrt{d_N^2 + d_E^2} \quad (24)$$

where a is the semi-major axis of the WGS84 reference ellipse in meters; $e^2$ is the first eccentric of the WGS84 reference ellipse; W is a temporary value; M is the meridian radius curvature, $\phi_k$ is the latitude of the current update; $\lambda_k$ is the longitude of the current update; $\phi_{k-1}$ is the latitude of the previous update; $\lambda_{k-1}$ is the longitude of the previous update; $d_N$ is the radians of latitude per meter for the current latitude and reference elevation; $d_E$ is the radians of longitude per meter for the current latitude and reference elevation; and $d_{k-1,k}$ is the horizontal distance between $\phi_k$, $\lambda_{k-1}$, and $\lambda_{k-1}$.

Various constants can be used by the mobile device to filter DEM elevation values and detect elevation measurement error events (e.g., bridge and tunnel events). For example, the mobile device can be configured with a maximum slope threshold value (e.g., $s_{max}$=0.28), a recovery slope value (e.g., $s_{recovery}$=0.04), a number of consecutive fall events to trigger a bridge event (e.g., $N_{bridge}$=3), a number of consecutive rise events to trigger a tunnel event (e.g., $N_{tunnel}=3$), and a variance of deweighted measurement (m²) (e.g., $R_{deweighted}=2000$).

Bridge Event Filtering

In some implementations, a fall event can occur when the calculated slope is less than $-s_{max}$. Except upon the recovery of a bridge or tunnel event, observations are deweighted if the slope is less than $-s_{max}$.

A bridge event is defined by $N_{bridge}$ consecutive fall events. When a bridge event occurs, the Kalman filter deweights all new observations until the update elevation observation reaches or exceeds a predicted elevation value. Alternatively, there can be a timeout and/or distance traveled threshold that can reset the filter during a bridge event if the predicted elevation value is not reached. For example, the predicted elevation value can be calculated using Equation 25, below.

$$h_{bridge}=h_f-s_{recovery}d_{be,k} \quad (25)$$

where $h_{bridge}$ is the recovery point predicted elevation (m); $h_f$ is the current filter elevation (m), $s_{recovery}$ is a pessimistic slope value for the bridge (m); and $d_{be,k}$ is the horizontal distance from the start point of the bridge event to the current potential update.

An example bridge event data is illustrated by FIG. 8. The raw DEM elevation values (e.g., line 802) and the filtered elevation values (e.g., line 808) are shown. When the slope drops (e.g., around location 804), the DEM elevation observations are deweighted because the slope is less than $-s_{max}$. Next, $N_{bridge}$ consecutive fall events trigger the bridge event so that the Kalman filter deweights all observations until the recovery point elevation is met or exceeded. The recovery point (e.g, around location 806) is the first elevation value after the flat propagated period corresponding to line 808.

Tunnel Event Filtering

In some implementations, the mobile device can detect rise events based on DEM elevation values. For example, a rise event can occur when the calculated slope is greater than $s_{max}$. Except upon the recovery from a bridge or tunnel event, observations are deweighted if the slope is greater than $s_{max}$.

In some implementations, the mobile device can detect tunnel events based on detected rise events. For example, a tunnel event can be defined by $N_{tunnel}$ consecutive rise events. When a tunnel event occurs, the Kalman filter can deweight all new DEM elevation observations until the update elevation observation reaches or drops below a predicted elevation value. Alternatively, there can be a timeout and/or a distance travelled threshold that can reset the Kalman filter during a tunnel event if the predicted elevation value is not reached. For example, the predicted elevation value can be determined using Equation 26 below.

$$h_{tunnel}=h_f+s_{recovery}d_{te,k} \quad (26)$$

where $h_{tunnel}$ is the recovery point predicted elevation (m); $h_f$ is the current filter elevation (m), $s_{recovery}$ is a pessimistic slope value for the tunnel (m); and $d_{be,k}$ is the horizontal distance from the start point of the tunnel event to the current potential update.

An example tunnel event data is shown in FIG. 6, above. The raw DEM elevation (e.g., line 602) and the filtered elevation values (e.g., line 608) are shown. When the slope rises suddenly (e.g., around location 604), the DEM elevation observations can be deweighted because the slope is greater than $s_{max}$. Next, $N_{tunnel}$ consecutive rise events can trigger the tunnel event so that the filter deweights all observations until the recovery point elevation is met or exceeded (e.g., around location 606). The recovery point can be the first elevation value after the flat propagated period corresponding to line 608, for example.

Elevation Filtering Process

Figure 9:
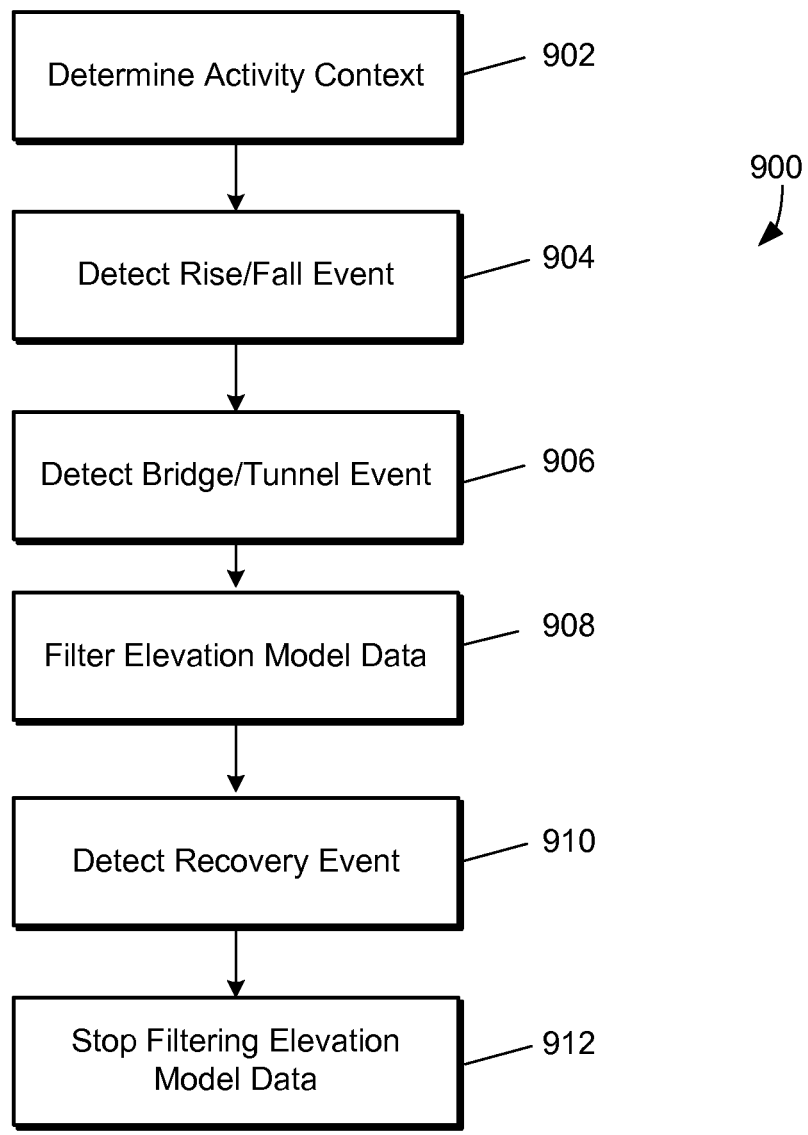
FIG. 9 is flow diagram of an example elevation filtering process.

FIG. 9 is flow diagram of an example elevation filtering process 900. For example, process 900 can be combined with tightly-coupled elevation-assisted estimation process 300 by inserting the steps of process 900 after step 408 and before step 410 of process 400.

At step 902, the activity context of the mobile device can be determined. For example, the mobile device can use various sensors (e.g., accelerometer, magnetometer, etc.) and/or GNSS data to determine movement (e.g., speed, direction, etc.) of the mobile device. If the mobile device is moving at a rate that exceeds a driving speed threshold value, then the context of the mobile device can be determined to be driving or moving in a vehicle. If the mobile device is moving at a rate that is less than the driving speed threshold, then the context of the mobile device can be determined to be walking or running. If the mobile device is not moving, the context of the mobile device can be stationary. When the activity context of the mobile device is the driving context (or walking, running context), elevation filtering can be performed according to the following steps.

At step 904, rise and/or fall events can be detected. For example, the DEM elevation data can be analyzed to determine changes in the elevation data. When the elevation data indicates a slope value (e.g., absolute value, unsigned value) that exceeds a specified or predetermined value, a rise and/or fall event can be detected.

At step 906, a bridge and/or tunnel event (e.g., an elevation measurement error event) can be detected. For example, when a specified or predetermined number of (e.g., consecutive) rise or fall events is detected a bridge or tunnel event can be detected. For example, three consecutive rise events can trigger a tunnel event. Four consecutive fall events can trigger a bridge event.

At step 908, the DEM elevation data can be filtered or adjusted in response to detecting the bridge or tunnel event at step 906. For example, the DEM elevation data for the location of the mobile device can be monitored but not used. Instead, the DEM elevation data can be deweighted so that the elevation data does not effect the location estimate. Alternatively, an estimate of the elevation of the mobile device can be used to perform the location estimation of the mobile device while the DEM data is filtered. For example, the elevation estimate can be a DEM elevation measurement of the mobile device observed prior to the detected bridge or tunnel event.

At step 910, a recovery event can be detected. For example, the recovery event can correspond to the end of the bridge or tunnel and can indicate that the mobile device can resume using DEM elevation data for location estimation. The recovery event can be detected when the DEM elevation data indicates that the current elevation measurement corresponds to (e.g., matches, crosses) a predicted elevation. For example, the predicted recovery elevation can be calculated using to Equations (25) and/or (26) above.

At step 912, upon detection of the recovery event, the mobile device can stop filtering DEM elevation data. For example, the mobile device can resume using the unfiltered DEM elevation data to perform the tightly-coupled elevation-assisted location estimation process described above.

Example System Architecture

Figure 10:
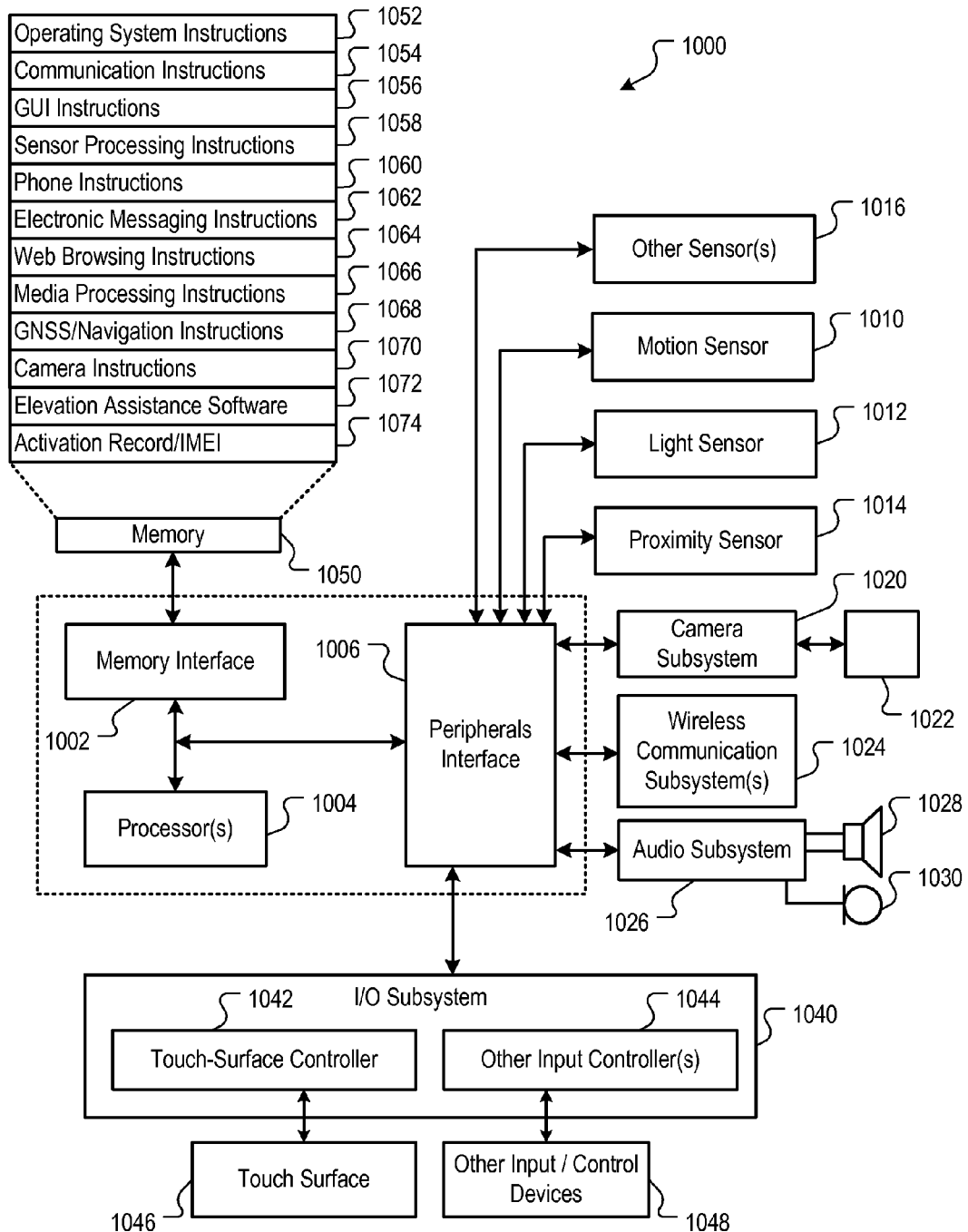
FIG. 10 is a block diagram of an example computing device that can implement the features and processes of FIGS. 1-9.

FIG. 10 is a block diagram of an example computing device 1000 that can implement the features and processes of FIGS. 1-9. The computing device 1000 can include a memory interface 1002, one or more data processors, image processors and/or central processing units 1004, and a peripherals interface 1006. The memory interface 1002, the one or more processors 1004 and/or the peripherals interface 1006 can be separate components or can be integrated in one or more integrated circuits. The various components in the computing device 1000 can be coupled by one or more communication buses or signal lines.

Sensors, devices, and subsystems can be coupled to the peripherals interface 1006 to facilitate multiple functionalities. For example, a motion sensor 1010, a light sensor 1012, and a proximity sensor 1014 can be coupled to the peripherals interface 1006 to facilitate orientation, lighting, and proximity functions. Other sensors 1016 can also be connected to the peripherals interface 1006, such as a global navigation satellite system (GNSS) (e.g., GPS receiver), a temperature sensor, a biometric sensor, or other sensing device, to facilitate related functionalities. For example, computing device 1000 can include a GNSS processor that can be configured to implement some or all of the processes and features described with reference to FIGS. 1-9 above.

A camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips. The camera subsystem 1020 and the optical sensor 1022 can be used to collect images of a user to be used during authentication of a user, e.g., by performing facial recognition analysis.

Communication functions can be facilitated through one or more wireless communication subsystems 1024, which can include radio frequency receivers and transmitters and/or optical (e.g., infrared) receivers and transmitters. The specific design and implementation of the communication subsystem 1024 can depend on the communication network(s) over which the computing device 1000 is intended to operate. For example, the computing device 1000 can include communication subsystems 1024 designed to operate over a GSM network, a GPRS network, an EDGE network, a Wi-Fi or WiMax network, and a Bluetooth™ network. In particular, the wireless communication subsystems 1024 can include hosting protocols such that the device 100 can be configured as a base station for other wireless devices.

An audio subsystem 1026 can be coupled to a speaker 1028 and a microphone 1030 to facilitate voice-enabled functions, such as speaker recognition, voice replication, digital recording, and telephony functions. The audio subsystem 1026 can be configured to facilitate processing voice commands, and voice authentication, for example.

The I/O subsystem 1040 can include a touch-surface controller 1042 and/or other input controller(s) 1044. The touch-surface controller 1042 can be coupled to a touch surface 1046. The touch surface 1046 and touch-surface controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1046.

The other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of the speaker 1028 and/or the microphone 1030.

In one implementation, a pressing of the button for a first duration can disengage a lock of the touch surface 1046; and a pressing of the button for a second duration that is longer than the first duration can turn power to the computing device 1000 on or off. Pressing the button for a third duration can activate a voice control, or voice command, module that enables the user to speak commands into the microphone 1030 to cause the device to execute the spoken command. The user can customize a functionality of one or more of the buttons. The touch surface 1046 can, for example, also be used to implement virtual or soft buttons and/or a keyboard.

In some implementations, the computing device 1000 can present recorded audio and/or video files, such as MP3, AAC, and MPEG files. In some implementations, the computing device 1000 can include the functionality of an MP3 player, such as an iPod™. The computing device 1000 can, therefore, include a 36-pin connector that is compatible with the iPod. Other input/output and control devices can also be used.

The memory interface 1002 can be coupled to memory 1050. The memory 1050 can include high-speed random access memory and/or non-volatile memory, such as one or more magnetic disk storage devices, one or more optical storage devices, and/or flash memory (e.g., NAND, NOR). The memory 1050 can store an operating system 1052, such as Darwin, RTXC, LINUX, UNIX, OS X, WINDOWS, or an embedded operating system such as VxWorks.

The operating system 1052 can include instructions for handling basic system services and for performing hardware dependent tasks. In some implementations, the operating system 1052 can be a kernel (e.g., UNIX kernel). In some implementations, the operating system 1052 can include instructions for performing the aspects and features described with reference to FIGS. 1-9. In some implementations, operating system 352 can implement the features described with reference to FIGS. 1-9.

The memory 1050 can also store communication instructions 1054 to facilitate communicating with one or more additional devices, one or more computers and/or one or more servers. The memory 1050 can include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GNSS/Navigation instructions 1068 to facilitate GNSS and navigation-related processes and instructions; and/or camera instructions 1070 to facilitate camera-related processes and functions.

The memory 1050 can store other software instructions 1072 to facilitate other processes and functions, such as processes, applications and functions that can use the location estimate generated using the features described with reference to FIGS. 1-9.

The memory 1050 can also store other software instructions (not shown), such as web video instructions to facilitate web video-related processes and functions; and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. An activation record and International Mobile Equipment Identity (IMEI) 1074 or similar hardware identifier can also be stored in memory 1050.

Each of the above identified instructions and applications can correspond to a set of instructions for performing one or more functions described above. These instructions need not be implemented as separate software programs, procedures, or modules. The memory 1050 can include additional instructions or fewer instructions. Furthermore, various functions of the computing device 1000 can be implemented in hardware and/or in software, including in one or more signal processing and/or application specific integrated circuits.

What is claimed is:

1. A method comprising:
   receiving, by a processor of a mobile device, global navigation satellite system (GNSS) data;
   receiving, by the processor, elevation data for a current location of the mobile device from an elevation data model;
   determining, by the processor, that a bridge event or tunnel event has occurred based on the elevation data;
   adjusting, by the processor, the elevation data in response to the bridge event or tunnel event; and
   estimating, by the processor, a location of the mobile device based on the GNSS data and the adjusted elevation.

2. The method of claim 1, wherein the elevation data model comprises a look-up table of elevation data indexed by location.

3. The method of claim 1, wherein estimating the location of the mobile device comprises performing a tightly-coupled estimation using the elevation data and GNSS data measurements as input to the estimation.

4. The method of claim 1, wherein estimating the location of the mobile device comprises performing sequential Kalman filter measurement updates using the elevation data as input to the Kalman filter.

5. The method of claim 1, further comprising:
   determining that the mobile device is moving faster than a threshold speed value; and
   excluding the elevation data from the location estimation when a slope between the elevation and a previous elevation is greater than a threshold slope value.

6. The method of claim 1, further comprising:
   determining that the mobile device is moving faster than a threshold speed value; and
   excluding the elevation data from the location estimation when a slope between the elevation and a previous elevation is less than a threshold slope value.

7. The method of claim 1, further comprising:
   determining that elevation data for the current location is not stored on the mobile device; and
   receiving elevation data for the current location from a network resource.

8. The method of claim 7, wherein receiving elevation data for the current location comprises receiving a DEM tile for an area corresponding to the current location and one or more DEM tiles adjacent to the DEM tile.

9. The method of claim 1, wherein determining an elevation based on the stored elevation data and the current location comprises propagating the current location forward a number of seconds and determining the elevation based on the stored elevation data and the propagated location.

10. The method of claim 1, further comprising:
    adding a user elevation bias to the elevation to generate an adjusted elevation; and
    estimating the location of the mobile device based on the adjusted elevation and the GNSS data.

11. A non-transitory computer-readable medium including one or more sequences of instructions which, when executed by one or more processors, causes:
    receiving global navigation satellite system (GNSS) data at a mobile device;
    receiving, at the mobile device, elevation data for a current location of the mobile device from an elevation data model;
    determining that a bridge event or tunnel event has occurred based on the elevation data;
    adjusting the elevation data in response to the bridge event or tunnel event; and
    estimating a location of the mobile device based on the GNSS data and the adjusted elevation data.

12. The non-transitory computer-readable medium of claim 11, wherein the elevation data model comprises a look-up table of elevation data indexed by location.

13. The non-transitory computer-readable medium of claim 11, wherein the instructions that cause estimating the location of the mobile device comprise instructions that cause performing a tightly-coupled estimation using the elevation data and GNSS data measurements as input to the estimation.

14. The non-transitory computer-readable medium of claim 11, wherein the instructions that cause estimating the location of the mobile device comprise instructions that cause performing sequential Kalman filter measurement updates using the elevation data as input to the Kalman filter.

15. The non-transitory computer-readable medium of claim 11, wherein the instructions cause:
    determining that the mobile device is moving faster than a threshold speed value; and
    excluding the elevation data from the location estimation when a slope between the elevation and a previous elevation is greater than a threshold slope value.

16. The non-transitory computer-readable medium of claim 11, wherein the instructions cause:
    determining that the mobile device is moving faster than a threshold speed value; and
    excluding the elevation data from the location estimation when a slope between the elevation and a previous elevation is less than a threshold slope value.

17. The non-transitory computer-readable medium of claim 11, wherein the instructions cause:
    determining that elevation data for the current location is not stored on the mobile device; and
    receiving elevation data for the current location from a network resource.

18. The non-transitory computer-readable medium of claim 17, wherein the instructions that cause receiving elevation data for the current location comprise instructions that cause receiving a DEM tile for an area corresponding to the current location and one or more DEM tiles adjacent to the DEM tile.

19. The non-transitory computer-readable medium of claim 11, wherein the instructions that cause determining an elevation based on the stored elevation data and the current location comprise instructions that cause propagating the current location forward a number of seconds and determining the elevation based on the stored elevation data and the propagated location.

20. The non-transitory computer-readable medium of claim 11, wherein the instructions cause:
  adding a user elevation bias to the elevation to generate an adjusted elevation; and
  estimating the location of the mobile device based on the adjusted elevation and the GNSS data.

21. A system comprising:
  one or more processors; and
  a computer-readable medium including one or more sequences of instructions which, when executed by the one or more processors, causes:
  receiving global navigation satellite system (GNSS) data at a mobile device;
  receiving, at the mobile device, elevation data for a current location of the mobile device from an elevation data model;
  determining that a bridge event or tunnel event has occurred based on the elevation data;
  adjusting the elevation data in response to the bridge event or tunnel event; and
  estimating a location of the mobile device based on the GNSS data and the adjusted elevation data.

22. The system of claim 21, wherein the elevation data model comprises a look-up table of elevation data indexed by location.

23. The system of claim 21, wherein the instructions that cause estimating the location of the mobile device comprise instructions that cause performing a tightly-coupled estimation using the elevation data and GNSS data measurements as input to the estimation.

24. The system of claim 21, wherein the instructions that cause estimating the location of the mobile device comprise instructions that cause performing sequential Kalman filter measurement updates using the elevation data as input to the Kalman filter.

25. The system of claim 21, wherein the instructions cause:
  determining that the mobile device is moving faster than a threshold speed value; and
  excluding the elevation data from the location estimation when a slope between the elevation and a previous elevation is greater than a threshold slope value.

26. The system of claim 21, wherein the instructions cause:
  determining that the mobile device is moving faster than a threshold speed value; and
  excluding the elevation data from the location estimation when a slope between the elevation and a previous elevation is less than a threshold slope value.

27. The system of claim 21, wherein the instructions cause:
  determining that elevation data for the current location is not stored on the mobile device; and
  receiving elevation data for the current location from a network resource.

28. The system of claim 27, wherein the instructions that cause receiving elevation data for the current location comprise instructions that cause receiving a DEM tile for an area corresponding to the current location and one or more DEM tiles adjacent to the DEM tile.

29. The system of claim 21, wherein the instructions that cause determining an elevation based on the stored elevation data and the current location comprise instructions that cause propagating the current location forward a number of seconds and determining the elevation based on the stored elevation data and the propagated location.

30. The system of claim 21, wherein the instructions cause:
  adding a user elevation bias to the elevation to generate an adjusted elevation; and
  estimating the location of the mobile device based on the adjusted elevation and the GNSS data.

* * * * *